(12) United States Patent
Tsutsui et al.

(10) Patent No.: US 6,515,037 B2
(45) Date of Patent: Feb. 4, 2003

(54) POLYPROPYLENE BASE RESIN COMPOSITION FOR FOAM-MOLDING, FOAMED ARTICLE USING THE SAME COMPOSITION, PRODUCTION PROCESS FOR THE SAME FOAMED ARTICLE AND FOAM-MOLDED PRODUCT USING THE FOAMED-ARTICLE

(75) Inventors: Mototake Tsutsui, Chiba (JP); Hiroyuki Maehara, Chiba (JP); Kouichi Hatada, Chiba (JP); Tsutomu Ushioda, Chiba (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 77 days.

(21) Appl. No.: 09/784,025

(22) Filed: Feb. 16, 2001

(65) Prior Publication Data

US 2001/0020045 A1 Sep. 6, 2001

(30) Foreign Application Priority Data

Feb. 29, 2000 (JP) .................................. 2000-053896
Mar. 28, 2000 (JP) .................................. 2000-088926

(51) Int. Cl.⁷ ................................................ C08J 9/00
(52) U.S. Cl. ...................... 521/142; 521/142; 521/150; 526/160; 526/335; 526/351; 526/943
(58) Field of Search ................. 526/160, 335, 526/351, 943; 521/142, 150

(56) References Cited

U.S. PATENT DOCUMENTS

| | | | |
|---|---|---|---|
| 4,596,833 A | 6/1986 | Endo et al. | 521/60 |
| 5,047,485 A | 9/1991 | DeNicola, Jr. | 525/387 |
| 5,219,968 A | 6/1993 | Shiomura et al. | 526/283 |
| 5,476,903 A | 12/1995 | Shinozaki et al. | 525/232 |
| 5,670,595 A | 9/1997 | Meka et al. | 526/336 |
| 6,388,040 B1 * | 6/2002 | Fujita et al. | |
| 6,303,727 B1 * | 10/2002 | Maeda et al. | |

FOREIGN PATENT DOCUMENTS

| | | |
|---|---|---|
| EP | 1008607 A1 | 6/2000 |
| JP | 59-93711 | 5/1984 |
| JP | 60-31538 | 2/1985 |
| JP | 60-45656 | 3/1985 |
| JP | 61-28694 | 7/1986 |
| JP | 61-152754 | 7/1986 |
| JP | 1-12770 | 3/1989 |
| JP | 4-55410 | 2/1992 |
| JP | 7-138327 | 5/1995 |
| JP | 7-165814 | 6/1995 |
| JP | 8-92317 | 4/1996 |

* cited by examiner

*Primary Examiner*—Morton Foelak
(74) *Attorney, Agent, or Firm*—McDermott, Will & Emery

(57) ABSTRACT

A polypropylene base resin composition for foam-molding which use's a propylene•α,ω-diene base copolymer containing a small amount of α,ω-diene and obtained by copolymerizing propylene with a specific amount of α,ω-diene in the presence of a catalyst system for polymerizing olefin comprising a metallocene supported catalyst or a preactivated metallocene supported catalyst and an organic aluminum compound and which provides a foamed article having uniform and fine foamed cells (bubbles) and a high foaming magnification, a foamable polypropylene base resin composition comprising the propylene•α,ω-diene base copolymer and a specific amount of a foaming agent, a foamed article obtained by foam-molding the above composition, a production process for the above foamed article and a foam-molded product prepared by heat-molding the above foamed article.

8 Claims, No Drawings

POLYPROPYLENE BASE RESIN COMPOSITION FOR FOAM-MOLDING, FOAMED ARTICLE USING THE SAME COMPOSITION, PRODUCTION PROCESS FOR THE SAME FOAMED ARTICLE AND FOAM-MOLDED PRODUCT USING THE FOAMED-ARTICLE

TECHNICAL FIELD

The present invention relates to a polypropylene base resin composition for foam-molding which uses a propylene•α,ω-diene base copolymer containing a small amount of α,ω-diene and obtained by copolymerizing propylene with a specific amount of α,ω-diene in the presence of a catalyst system for polymerizing olefin comprising a metallocene supported catalyst or a pre-activated metallocene supported catalyst and an organic aluminum compound and which provides a foamed article having uniform and fine foamed cells (bubbles) and a high foaming magnification, a foamable polypropylene base resin composition comprising the propylene•α,ω-diene base copolymer and a specific amount of a foaming agent, a foamed article obtained by foam-molding the above composition, a production process for the above foamed article and a foam-molded product prepared by heat-molding the above foamed article.

BACKGROUND ART

Polypropylene is excellent in a mechanical property and a chemical resistance and very useful in terms of balance with profitability, so that it is widely used in the various molding fields.

A foamable thermoplastic resin composition obtained by adding azodicarbonamide and zinc hydroxycarbonate to a thermoplastic resin containing a polypropylene resin is disclosed in Japanese Patent Application Laid-Open No. 45656/1985 as a method for obtaining such formed article of polypropylene or a composition (particle) which provides a formed article of polypropylene; disclosed in Japanese Patent Publication No. 46532/1989 is a foamable polypropylene base resin composition comprising 70 to 99.8% by weight of a polypropylene base resin which comprises propylene, α-olefin of hexene-1 or 4-methylpentene-1 and, if necessary, ethylene or butene-1 and in which at least one of melting peaks based on differential scanning calorimetric analysis is present at 130° C. or higher when the α-olefin described above is hexene-1 and at 145° C. or higher when the α-olefin described above is 4-methylpentene-1 and a density is 0.887 g/cm$^3$ or less after annealing at 105° C. for 90 minutes based on JIS-K6758 and 0.2 to 30% by weight of a foaming agent; disclosed in Japanese Patent Application Laid-Open No. 103944/1986 are polypropylene foamed particles which are substantially non-cross-linked polypropylene foamed particles having a density of 8 to 100 g/liter and a particle diameter of 1 to 5 mm and contain organic sodium phosphate; and disclosed in Japanese Patent Application Laid-Open No. 31538/1985 is a production process for a polyolefin copolymer-foamed article characterized by introducing a solvent or gas into a mixture of a propylene polymer or a propylene-ethylene block copolymer having an ethylene content of 1 to 20% by weight and a propylene-α-olefin copolymer by using an extruder and foam it.

However, a polypropylene base resin has a large temperature dependency of a melt viscosity, and a reduction in the melt viscosity suddenly grows large as the melting temperature is elevated. Accordingly, it becomes difficult to maintain a strength of a bubble wall in foaming, so that it has been difficult to obtain a foamed article having a high independent cell ratio.

Disclosed as a method for improving such performances of the foamed articles of the polypropylene base resins are a method in which a cross-linking agent is reacted with polypropylene in a melting state in the presence of an organic peroxide to produce a partial cross-linked structure in the molten resin to thereby inhibit a reduction in a melt viscosity (Japanese Patent Application Laid-Open No. 93711/1984 and Japanese Paten Application Laid-Open No. 15275/1986) and a method in which a low decomposition temperature-peroxide is reacted with semi-crystalline polypropylene in the absence of oxygen to obtain polypropylene having a free end-long chain branch and containing no gel (Japanese Patent Application Laid-Open No. 298536/1990).

Further, disclosed as other methods for improving a temperature dependency of a melt visco-elasticity of a polypropylene base resin are compositions in which polyethylene or polypropylene having a different intrinsic viscosity or molecular weight is blended to expand a molecular weight distribution and a production process in which such compositions as described above are produced by multistage polymerization to thereby produce polypropylene having a high melt strength.

Disclosed are, for example, a method in which ultra high molecular weight polypropylene is added in a proportion 2 to 30 parts by weight per 100 parts by weight of conventional polypropylene and the mixture is extrusion-molded to thereby improve a melt visco-elasticity (Japanese Patent Publication No. 28694/1986) and an extruded sheet comprising polypropylene comprising two components produced by a multistage polymerization process which have a limiting viscosity ratio of 2 or more and different molecular weights (Japanese Patent Publication No. 12770/1989).

Further, proposed are a production process in which a pre-polymerization catalyst prepared by pre-polymerizing ethylene and a polyene compound on a supported titanium-containing catalyst component and an organic aluminum compound catalyst component is used to polymerize propylene to thereby produce polypropylene having a high melt strength (Japanese Patent Application Laid-Open 222122/1993) and a production process in which the same catalyst components are used to pre-polymerize ethylene alone and an ethylene-containing pre-polymerization catalyst containing polyethylene having a limiting viscosity of 20 dl/g or more is used to thereby produce an ethylene.α-olefin copolymer having a high melt strength (Japanese Patent Application Laid-Open 55410/1992).

In various polypropylene base compositions and production processes for them, a melt strength of propylene can be elevated to some extent but is not yet satisfactory, and there still remain such points to be improved that gas generated from a foaming agent can not sufficiently be incorporated into a molten resin and therefore it is very difficult to elevate the foaming magnification.

Further, in a multistage polymerization process in which a production step for polyolefin of a high molecular weight is incorporated into a conventional propylene (co)polymerization step in the present polymerization, it is difficult to control an olefin (co)polymerization amount for producing a trace amount of polyolefin having a high molecular weight, and a low polymerization temperature for producing polyolefin having a sufficiently high molecular weight is required. Accordingly, the process has to be modified, and further involved is the problem that the finished polypropylene resin is reduced in a productivity.

Further, in a process in which a polyene compound is used to carry out pre-polymerization, the polyene compound has to be separately prepared.

SUMMARY OF THE INVENTION

The present inventors repeated intensive investigations in order to obtain a polypropylene base resin composition which provides a foamed article having uniform and fine foamed cells (bubbles) and a high foaming magnification. As a result thereof, they have found that a propylene•α, ω-diene base copolymer containing a small amount of α, ω-diene and obtained by copolymerizing propylene with α, ω-diene in the presence of a catalyst system for (co) polymerizing olefin comprising a specific metallocene supported catalyst or a pre-activated metallocene supported catalyst obtained by supporting the above metallocene supported catalyst into contact with olefin to pre-(co)polymerize the olefin and further supported the above pre-(co) polymerized olefin polymer and an organic aluminum compound is used to carry out foam-molding to thereby obtain a foamed article having uniform and fine foamed cells (bubbles) and a high foaming magnification. Thus, they have completed the present invention based on this finding.

As apparent from the above descriptions, an object of the present invention is to provide a polypropylene base resin composition for foam-molding which provides a foamed article having uniform and fine foamed cells (bubbles) and a high foaming magnification, a foamable polypropylene base resin composition, a foamed article obtained by using the above composition, a production process for the above foamed article and a foam-molded product prepared by heat-molding the above foamed article.

The present invention consists in the following items.

(1) A polypropylene base resin composition for foam-molding comprising a propylene•α, ω-diene base copolymer containing 0.00001 to 2% by weight of α, ω-diene and a foaming nuclear agent contained therein, wherein the propylene•α, ω-diene base copolymer is obtained by copolymerizing propylene with α, ω-diene in the presence of a catalyst system for (co) polymerizing olefin comprising a metallocene supported catalyst obtained by carrying out in order the following step (a) to step (c) or a pre-activated metallocene supported catalyst obtained by carrying out in order the following step (a) to step (d) and an organic aluminum compound:

(a): a step for reacting an organic transition metal compound having at least one π electron conjugated ligand with aluminoxane in an inert solvent to produce a reaction product-a which is a metallocene catalyst, (b): a step for supporting the reaction product-a which is a metallocene catalyst obtained in the step (a) into contact with an inorganic particulate carrier at a temperature of 85 to 150° C. in the presence of an inert solvent to support the above metallocene catalyst on the inorganic particulate carrier to produce a reaction product-b which is a crude metallocene supported catalyst, (c): a step for producing a refined metallocene supported catalyst obtained by carrying out in order steps for washing at least twice the reaction product-b which is a crude metallocene supported catalyst obtained in the step (b) with aliphatic hydrocarbon at a temperature of −50 to 50° C., and (d): a step for supporting the metallocene supported catalyst obtained in the step (c) into contact with at least one olefin to (co)polymerize the above olefin and supporting an olefin pre-(co)polymer on the metallocene supported catalyst to produce a pre-activated metallocene supported catalyst.

(2) A foamable polypropylene base resin composition comprising 100 parts by weight of the propylene•α, ω-diene base copolymer as described in the above item (1) and 0.1 to 50 parts by weight of a foaming agent.

(3) A polypropylene base resin-foamed article obtained by heating, melting and kneading the polypropylene base resin composition for foam-molding as described in the above item (1) at a high temperature and a high pressure by means of an extruder, then dispersing gas or a volatile liquid in the above molten resin, extruding it under a low pressure to foam it and cooling and solidifying it.

(4) A polypropylene base resin-foamed article obtained by heating, melting and kneading the foamable polypropylene base resin composition as described in the above item (2) at a high temperature and a high pressure by means of an extruder, then extruding it under a low pressure to foam it and cooling and solidifying it.

(5) A production process for a polypropylene base resin-foamed article, comprising heating, melting and kneading the polypropylene base resin composition for foam-molding as described in the above item (1) at a high temperature and a high pressure by means of an extruding machine, then dispersing gas or a volatile liquid in the above molten resin, extruding it under a low pressure to foam it and cooling and solidifying it.

(6) A production process for a polypropylene base resin-foamed article, comprising heating, melting and kneading the foamable polypropylene base resin composition as described in the above item (2) at a high temperature and a high pressure by means of an extruder, then extruding it under a low pressure to foam it and cooling and solidifying it.

(7) A foam-molded product prepared by heat-molding the polypropylene base resin-foamed article as described in the above item (3) or (4).

(8) A foamed molded product prepared by heat-molding the polypropylene base resin-foamed article obtained by the production process as described in the above item (5) or (6).

DETAILED DESCRIPTION OF PREFFRED EMBODIMENT

The above propylene base copolymer used in the present invention contains 0.00001 to 2% by weight of α, ω-diene which is a first copolymerization component and can contain, in addition thereto, 70% by weight or less, more preferably 50% by weight or less of at least one compound selected from ethylene and α-olefin other than propylene as a second polymerization component.

The α, ω-diene used in the present invention is a diene compound having vinyl groups in an α-position and a ω-position and may have either a linear structure or a branched structure, and it may contain a hetero atom and atomic group such as oxygen, sulfur, boron and the like. To be specific, given as examples thereof are 1,3-butadiene, 1,4-pentadiene, 1,5-hexadiene, 1,6-hepadiene, 1,7- octadiene, 1,8-nonadiene, 1,9-decadiene, 1,10-undecadiene, 1,11-dodecadiene, 1,13-tetradecadiene and divinylbenzene. Preferably used are 1,5-hexadiene, 1,7-octadiene, 1,9-decadiene and 1,13-tetradecadiene, and 1,9-decadiene is most preferably used.

In the present invention, an amount of the α, ω-diene contained in the propylene base copolymer is 0.00001 to 2% by weight, preferably 0.0001 to 1% by weight, more preferably 0.001 to 1% by weight and particularly preferably 0.001 to 0.5% by weight. If the content of the above α, ω-diene is less than 0.00001% by weight or exceeds 2% by weight, the effect of the present invention, that is, the propylene base copolymer which provides a foamed article having uniform and fine foamed cells (bubbles) and a high foaming magnification is not obtained.

The content of the α, ω-diene contained in the propylene base copolymer used in the present invention can be determined, as described in Japanese Patent Application Laid-Open No. 138327/1995 and Japanese Patent Application Laid-Open No. 92317/1996, by making use of $^{13}$C-NMR or calculating from a difference between an amount of a diene monomer fed in polymerization and an amount of the unreacted diene monomer recovered after finishing the polymerization.

Capable of being given as examples of the second copolymerization component other than the α, ω-diene, which can be used in the production of the propylene base copolymer of the present invention are ethylene, 1-butene, 1-pentene, 1-hexene, 1-octene, 1-decene, 1-methyl-1-pentene and styrene, and ethylene and 1-butene are particularly preferably given. The content of the above second copolymerization component contained in the propylene base copolymer is 70% by weight or less, preferably 50% by weight or less.

The organic transition metal compound having at least one π electron conjugated ligand used in the step (a) described above shall not specifically be restricted, and a cross-linked metallocene compound represented by the following Formula (A) can preferably be shown:

$$Q(C_5H_{4-m}R^1{}_m)(C_5H_{4-n}R^2{}_n)MXY \quad (A)$$

wherein $(C_5H_{4-m}R^1{}_m)$ and $(C_5H_{4-n}R^2{}_n)$ represent a substituted cyclopentadienyl group; m and n represent an integer of 1 to 3; $R^1$ and $R^2$ represent a hydrocarbon group having 1 to 20 carbon atoms, a silicon-containing hydrocarbon group or a hydrocarbon group which is bonded with two carbon atoms on the cyclopentadienyl ring to form at least one hydrocarbon ring allowed to be substituted with hydrocarbon and which may be the same or different; the position and the kind of $R^1$ and $R^2$ on the cyclopentadienyl ring shall assume a position where a symmetry plane containing M is not present; $R^1$ or $R^2$ shall be present on at least one of carbons adjacent to carbons bonded to Q in at least one of the cyclopentadienyl rings; Q represents a hydrocarbon group, a non-substituted silylene group or a hydrocarbon-substituted silylene group each of which is divalent and cross-links $(C_5H_{4-m}R^1{}_m)$ and $(C_5H_{4-n}R^2{}_n)$; M represents transition metal which is titanium, zirconium or hafnium; and X and Y may be the same or different and represent hydrogen, halogen or a hydrocarbon group.

Specific examples of the cross-linked metallocene compound represented by Formula (A) described above include, for example, dimethylsilylene(3-t-butylcyclopentadienyl)(fluolenyl)zirconium dichloride, dimethylsilylene(3-t-butylcyclopentadienyl)(fluolenyl)hafnium dichloride, rac-ethylenebis(indenyl)zirconium dimethyl, rac-ethylenebis(indenyl)zirconium dichloride, rac-dimethylsilylenebis(indenyl)zirconium dimethyl, rac-dimethylsilylenebis(indenyl)zirconium dichloride, rac-ethylenebis(tetrahydroindenyl)zirconium dimethyl, rac-dimethylgermylbis(indenyl)zirconium dimethyl, rac-dimethylgermylbis(indenyl)zirconium dichloride, rac-ethylenebis(tetrahydroindenyl)zirconium dimethyl, rac-ethylenebis(tetrahydroindenyl)zirconium dichloride, rac-dimethylsilylenebis(tetrahydroindenyl)zirconium dimethyl, rac-dimethylsilylenebis(tetrahydroindenyl)zirconium dichloride, rac-dimethylgermylbis(tetrahydroindenyl)zirconium dimethyl, rac-dimethylgermylbis(tetrahydroindenyl)zirconium dichloride, rac-dimethylsilylenebis(2-methyl-4,5,6,7-tetrahydroindenyl)zirconium dichloride, rac-dimethylsilylenebis(2-methyl-4,5,6,7-tetrahydroindenyl)zirconium dimethyl, rac-dimethylgermylbis(2-methyl-4,5,6,7-tetrahydroindenyl)zirconium dichloride, rac-dimethylgermylbis(2-methyl-4,5,6,7-tetrahydroindenyl)zirconium dimethyl, rac-ethylenebis(2-methyl-4,5,6,7-tetrahydroindenyl)hafnium dichloride, rac-dimethylsilylenebis(2-methyl-4-phenylindenyl)zirconium dichloride, rac-dimethylsilylenebis(2-methyl-4-phenylindenyl)zirconium dimethyl, rac-dimethylgermylbis(2-methyl-4-phenylindenyl)zirconium dichloride, rac-dimethylgermylbis(2-methyl-4-phenylindenyl)zirconium dimethyl, rac-dimethylsilylenebis(2-methyl-4-phenylindenyl)hafnium dichloride, rac-dimethylsilylenebis(2-methyl-4-naphthylindenyl) zirconium dimethyl, rac-dimethylsilylenebis(2-methyl-4-naphthylindenyl)hafnium dichloride, rac-dimethylgermylbis(2-methyl-4-naphthylindenyl) zirconium dimethyl, rac-dimethylgermylbis(2-methyl-4-naphthylindenyl)hafnium dichloride, rac-dimethylsilylenebis(2-methyl-4,5-benzoindenyl)zirconium dichloride, rac-dimethylsilylenebis(2-methyl-4,5-benzoindenyl)zirconium dimethyl, rac-dimethylgermylbis(2-methyl-4,5-benzoindenyl)zirconium dichloride, rac-dimethylgermylbis(2-methyl-4,5-benzoindenyl)zirconium dimethyl, rac-dimethylsilylenebis(2-methyl-4,5-benzoindenyl)hafnium dichloride, rac-dimethylsilylenebis(2-ethyl-4-phenylindenyl)zirconium dichloride, rac-dimethylsilylenebis(2-ethyl-4-phenylindenyl)zirconium dimethyl, rac-dimethylgermylbis(2-ethyl-4-phenylindenyl)zirconium dichloride, rac-dimethylsilylenebis(2-ethyl-4-phenylindenyl)hafnium dichloride, rac-dimethylsilylenebis(2-methyl-4,6-diisopropylindenyl)zirconium dichloride, rac-dimethylsilylenebis(2-methyl-4,6-diisopropylindenyl)zirconium dimethyl, rac-dimethylgermylbis(2-methyl-4,6-diisopropylindenyl)zirconium dichloride, rac-dimethylsilylenebis(2-methyl-4,6-diisopropylindenyl)hafnium dichloride, dimethylsilylene(2,4-dimethylcyclopentadienyl)(3',5'-dimethylcyclopentadienyl)titanium dichloride, dimethylsilylene(2,4-dimethylcyclopentadienyl)(3',5'-dimethylcyclopentadienyl)zirconium dichloride, dimethylsilylene(2,4-dimethylcyclopentadienyl)(3',5'-dimethylcyclopentadienyl)zirconium dimethyl, dimethylgermyl(2,4-dimethylcyclopentadienyl)(3',5'-dimethylcyclopentadienyl)zirconium dichloride, dimethylgermyl(2,4-dimethylcyclopentadienyl)(3',5'-dimethylcyclopentadienyl)zirconium dimethyl, dimethylsilylene(2,4-dimethylcyclopentadienyl)(3',5'-dimethylcyclopentadienyl)hafnium dichloride, dimethylsilylene(2,4-dimethylcyclopentadienyl)(3',5'-dimethylcyclopentadienyl)hafnium dimethyl, dimethylsilylene(2,3,5-trimethylcyclopentadienyl)(2',4',5'- trimethylcyclopentadienyl)titanium dichloride, dimethylsilylene(2,3,5-trimethylcyclopentadienyl)(2',4',5'-trimethylcyclopentadienyl)zirconium dichloride, dimethylsilylene(2,3,5-trimethylcyclopentadienyl)(2',4',5'-trimethylcyclopentadienyl)zirconium dimethyl, dimethylgermyl-(2,3,5-trimethylcyclopentadienyl)(2',4',5'-trimethylcyclopentadienyl)zirconium dichloride, dimethylgermyl(2,3,5-trimethylcyclopentadienyl)-(2',4',5'-trimethylcyclopentadienyl)zirconium dimethyl, dimethylsilylene(2,3,5-trimethylcyclopentadienyl)(2',4',5'-trimethylcyclopentadienyl)hafnium dichloride, dimethylsilylene(2,3,5-trimethylcyclopentadienyl)(2',4',5'-trimethylcyclopentadienyl)hafnium dimethyl, rac-dimethylsilylenebis(2-methyl-4-phenyldihydroazulenyl)zirconium dichloride and rac-dimethylsilylenebis(2-ethyl-4-phenyldihydroazulenyl)zirconium dichloride.

Among the cross-linked metallocene compounds described above, the particularly preferred compounds are dimethylsilylene(3-t-butylcyclopentadienyl)(fluolenyl)zirconium dichloride, rac-dimethylsilylenebis(2-methyl-4-phenylindenyl)zirconium dichloride, rac-dimethylgermylbis(2-methyl-4-phenylindenyl)zirconium dichloride, rac-dimethylsilylenebis(2-methyl-4-naphthylindenyl)zirconium dichloride, rac-dimethylgermylbis(2-methyl-4-naphthylindenyl)zirconium dichloride, rac-dimethylsilylenebis(2-methyl-4,5-benzoindenyl)zirconium dichloride, rac-dimethylgermylbis(2-methyl-4,5-benzoindenyl)zirconium dichloride, rac-dimethylsilylenebis(2-ethyl-4-phenylindenyl)zirconium dichloride, rac-dimethylgermylbis(2-ethyl-4-phenylindenyl)zirconium dichloride, rac-dimethylsilylenebis(2-methyl-4,6-diisopropylindenyl)zirconium dichloride, rac-dimethylgermylbis(2-methyl-4,6-diisopropylindenyl)zirconium dichloride, dimethylsilylene(2,4-dimethylcyclopentadienyl)(3',5'-dimethylcyclopentadienyl)zirconium dichloride, dimethylsilylene(2,4-dimethylcyclopentadienyl)(3',5'-dimethylcyclopentadienyl)zirconium dimethyl, dimethylgermyl(2,4-dimethylcyclopentadienyl)(3',5'-dimethylcyclopentadienyl)zirconium dichloride, dimethylgermyl(2,4-dimethylcyclopentadienyl)(3',5'-dimethylcyclopentadienyl)zirconium dimethyl, dimethylsilylene(2,4-dimethylcyclopentadienyl)(3',5'-dimethylcyclopentadienyl)hafnium dichloride, dimethylsilylene(2,4-dimethylcyclopentadienyl)(3',5'-dimethylcyclopentadienyl)hafnium dimethyl, dimethylsilylene(2,3,5-trimethylcyclopentadienyl)(2',4',5'-trimethylcyclopentadienyl)zirconium dichloride, dimethylsilylene(2,3,5-trimethyl-cyclopentadienyl)-(2',4',5'-trimethylcyclopentadienyl)zirconium dimethyl, dimethylgermyl-(2,3,5-trimethylcyclopentadienyl)(2',4',5'-trimethylcyclopentadienyl)zirconium dichloride, dimethylgermyl(2,3,5-trimethylcyclopentadienyl)(2',4',5'-trimethylcyclopentadienyl)zirconium dimethyl, dimethylsilylene(2,3,5-trimethylcyclopentadienyl)(2',4',5'-trimethylcyclopentadienyl)hafnium dichloride, dimethylsilylene(2,3,5-trimethylcyclopentadienyl)(2',4',5'-trimethylcyclopentadienyl)hafnium dimethyl and rac-dimethylsilylenebis(2-methyl-4-phenyldihydroazulenyl)zirconium dichloride.

The most preferred cross-linked metallocene compounds are dimethylsilylene(2,3,5-trimethylcyclopentadienyl)(2',4',5'-trimethylcyclopentadienyl)zirconium dichloride, dimethylgermyl(2,3,5-trimethylcyclopentadienyl)(2',4',5'-trimethylcyclopentadienyl)zirconium dichloride, dimethylsilylene(2,3,5-trimethylcyclopentadienyl)(2',4',5'-trimethylcyclopentadienyl)hafnium dichloride and rac-dimethylsilylenebis(2-methyl-4-phenylindenyl)zirconium dichloride.

Meso compounds corresponding to the racemic compounds described above may be contained as small as 5 mol % or less.

Aluminoxane is an organic aluminum compound represented by the following Formula [1] or [2]:

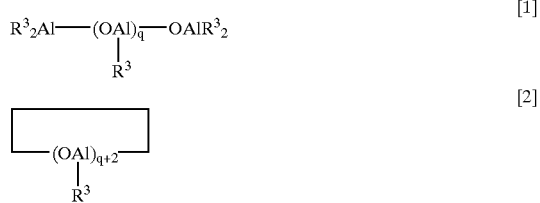

wherein $R^3$ represents a hydrocarbon group having 1 to 6, preferably 1 to 4 carbon atoms and, to be specific, includes alkyl groups such as methyl, ethyl, propyl, butyl, isobutyl, pentyl and hexyl, alkenyl groups such as allyl, 2-methylallyl, propenyl, isopropenyl, 2-methyl-1-propenyl and butenyl, cycloalkyl groups such as cyclopropyl, cyclobutyl, cyclopentyl and cyclohexyl, and aryl; among them, the alkyl groups are particularly preferred; respective $R^3$'s may be the same or different; q is an integer of 4 to 30, preferably 6 to 30 and particularly preferably 8 to 30.

The aluminoxane described above can be prepared under various publicly known conditions. To be specific, the following methods can be given as examples thereof:

(1) a method in which trialykylaluminum is reacted directly with water in an organic solvent such as toluene, ether and the like;

(2) a method in which trialykylaluminum is reacted with salts having crystallization water such as copper sulfate hydrate, aluminum sulfate hydrate and the like;

(3) a method in which trialykylaluminum is reacted with water impregnated in silica gel;

(4) a method in which a mixture of trimethylaluminum and triisobutylaluminum is reacted directly with water in an organic solvent such as toluene, ether and the like;

(5) a method in which a mixture of trimethylaluminum and triisobutylaluminum is reacted with salts having crystallization water such as copper sulfate hydrate, aluminum sulfate hydrate and the like; and (6) a method in which triisobutylaluminum is reacted with water impregnated in silica gel and then trimethylaluminum is further reacted therewith.

The inorganic particulate carrier used in the present invention is a granular or spherical inorganic solid fine particle having an average particle diameter of 5 to 300 $\mu$m, preferably 10 to 200 $\mu$m, and it is preferably a porous fine particle having a specific surface area falling in a range of 50 to 1,000 m$^2$/g, preferably 100 to 700 m$^2$/g and a pore volume falling in a range of 0.3 to 2.5 m$^3$/g The inorganic particulate carrier is preferably a metal oxide, for example, $SiO_2$, $Al_2O_3$, MgO, $TiO_2$, ZnO or a mixture thereof, and particularly preferred is the carrier containing $SiO_2$ or $Al_2O_3$ as the principal component. More specific inorganic compound includes $SiO_2$, $Al_2O_3$, MgO, $SiO_2$—$Al_2O_3$, $SiO_2$—MgO, $SiO_2$—$TiO_2$ and $SiO_2$—$Al_2O_3$—MgO, and $SiO_2$ is particularly preferred.

The inorganic particulate carrier is baked prior to use usually at 100 to 1,000° C., preferably 300 to 900° C. and particularly preferably 400 to 900° C. The inorganic particulate carrier obtained after baking has a surface-adsorbed moisture falling in a range of 0.1% by weight or less, preferably 0.01% by weight or less and a surface-hydroxyl group content falling in a range of 1.0% by weight or more, preferably 1.0 to 4.0% by weight and more preferably 2.0 to 3.5% by weight. These inorganic particulate carriers may be subjected in advance to contact treatment with an organic aluminum compound and/or a halogen-containing silicon compound prior to use.

Capable of being given as examples of the inert solvent used for a reaction of the metallocene compound with aluminoxane in the step (a) are aromatic hydrocarbons such as benzene, toluene, xylene and cumene; aliphatic hydrocarbons such as butane, tetramethylbutane, pentane, ethylpentane, trimethylpentane, hexane, methylhexane, ethylhexane, dimethylhexane, heptane, methylheptane, octane, nonane, decane, hexadecane and octadecane; alicyclic hydrocarbons such as cyclopentane, methylcyclopentane, cyclohexane and cyclooctane; halogenated hydrocarbons obtained by substituting the aromatic hydrocarbons, aliphatic hydrocarbons or alicyclic hydrocarbons described above with halogens; ethers such as ethyl ether and tetrahydrofuran; and mixed solvents thereof. The preferred inert solvent is aromatic hydrocarbon, and a solvent for a commercially available aluminoxane solution may be used as it is or by mixing with other aromatic hydrocarbons.

The metallocene catalyst of the reaction product-a of the cross-linked metallocene compound with aluminoxane which is produced in the step (a) is obtained by reacting one mole of the cross-linked metallocene compound with 10 to 1,000 mole, preferably 20 to 500 mole of aluminoxane in terms of an aluminum atom contained in the aluminoxane in an inert solvent on a temperature condition of −50 to 100° C., preferably 0 to 50° C. for one minute to 10 hours, preferably 3 minutes to 5 hours.

The inert solvent is preferably used in order to carry out the reaction homogeneously and efficiently. A use amount of the inert solvent shall not specifically be restricted and is usually 10 to 10,00 liters, preferably 10 to 1,000 liters per mole of the metallocene compound.

Subsequently, the metallocene catalyst of the reaction product-a which is obtained in the step (a) is brought into contact with the inorganic particulate carrier in the step (b) usually in the presence of the inert solvent used as a reaction solvent in the step (a), whereby the reaction product-a is carried on the inorganic particulate carrier to obtain the solid product-b which is a crude metallocene supported catalyst. The inert solvent may further be added, if necessary, in this contact reaction.

A proportion of the metallocene catalyst of the above reaction product-a to the inorganic particulate carrier is 1 to 1,000 kg, preferably 5 to 500 kg of the inorganic particulate carrier per mole of the transit metal atom contained in the reaction liquid. The inert solvent is used in an amount of 10 to 10,000 liters, preferably 10 to 1,000 liters per mole of the transit metal atom contained in the reaction liquid.

The metallocene catalyst of the reaction product-a is brought into contact with the inorganic particulate carrier on a temperature condition of 85 to 150° C., preferably 90 to 130° C. and particularly preferably 95 to 120° C. for 5 minutes to 100 hours, preferably 10 minutes to 50 hours. In particular, the temperature condition is an important factor, and they are brought into contact in the temperature range described above, whereby achieved are a high polymerization activity of the resulting metallocene supported catalyst and a high bulk density and a good particle property of the propylene base copolymer obtained by using the above supported catalyst.

The solid product-b which is the crude metallocene supported catalyst obtained in the step (b) is washed at least twice with aliphatic hydrocarbon in the subsequent step (c), whereby obtained is the refined metallocene supported catalyst in which the reaction product of the cross-linked metallocene compound with aluminoxane is supported on the inorganic particulate carrier.

Capable of being given as examples of the aliphatic hydrocarbon used in the step (c) are butane, tetramethylbutane, pentane, ethylpentane, trimethylpentane, hexane, methylhexane, ethylhexane, dimethylhexane, heptane, methylheptane, octane, nonane, decane, hexadecane, octadecane and a mixed solvent thereof. N-Hexane, isopentane or a mixture thereof is preferably used.

Capable of being employed as the step (c) are, for example, a method in which the inert solvent is separated from the reaction liquid slurry containing the solid product-b of the crude metallocene supported catalyst by means of filtration, centrifugation or decantation after finishing the step (b) and then the solid product-b which is the crude metallocene supported catalyst is washed with aliphatic hydrocarbon and a method in which after finishing the step (b), aliphatic hydrocarbon is added without separating the inert solvent from the reaction liquid slurry containing the solid product-b which is the crude metallocene supported catalyst and in which after separating the mixture of the inert solvent and the aliphatic hydrocarbon, the above solid product-b is washed with aliphatic hydrocarbon.

With respect to the washing conditions of the solid product-b which is the crude metallocene supported catalyst, the aliphatic hydrocarbon of 1 to 500 liters, preferably 10 to 100 liters per kg of the inorganic particulate carried is used in washing once to repeat washing under a temperature condition of −50 to 50° C., preferably −30 to 40° C. and particularly preferably −30 to 30° C. until the metallocene compound is not eluted in the aliphatic hydrocarbon after washing. It is enough to repeat washing twice, usually four times, but washing shall not be restricted thereto. In particular, the washing temperature condition is an important factor in the step (c), and washing carried out in the temperature range described above provides the resulting refined crude metallocene supported catalyst with a high polymerization activity; and use of the above metallocene supported catalyst provides the resulting propylene base copolymer with a high bulk density and a good particle property.

The metallocene supported catalyst thus obtained contains 0.01 to 5% by weight, preferably 0.03 to 2% by weight of transition metal originating in the cross-linked metallocene compound and 0.1 to 50% by weight, preferably 1 to 40% by weight of aluminum originating in the aluminoxane.

A content of the transition metal and a ratio of the content of the transition metal to that of aluminum exerts an influence on the polymerization activity in copolymerizing propylene with α, ω-diene, and if the content of the transition metal is too small, the practical polymerization activity is not obtained. On the other hand, if it is too large, an increase in the polymerization activity corresponding thereto is not achieved. The ratio of aluminum to the transit metal falls in a range of 1 to 200 moles, preferably 5 to 150 moles and more preferably 10 to 100 moles per mole of the transition metal.

The metallocene supported catalyst described above can be used as a catalyst for copolymerization of propylene with α, ω-diene carried out by a gas phase polymerization method or a bulk polymerization method by combining with an organic aluminum compound.

In the step (d), at least one olefin is brought into contact with the metallocene supported catalyst obtained in the step (c) and pre-(co)polymerized, whereby an olefin pre-(co) polymer is coated and supported on the metallocene supported catalyst, and a metallocene supported catalyst which is pre-activated, that is, a pre-activated metallocene supported catalyst is obtained. The preferred olefin pre-(co) polymerization method is a method in which olefin is introduced into a slurry obtained by dispersing the metallocene supported catalyst obtained in the step (c) in aliphatic hydrocarbon to pre-(co)polymerize it.

The metallocene supported catalyst obtained in washing in the final stage of the step (c) may be used without separating aliphatic hydrocarbon as the slurry in which the metallocene supported catalyst is dispersed in aliphatic hydrocarbon, or after the metallocene supported catalyst is separated, and then it may be redispersed in similar aliphatic hydrocarbon and used.

Pre-(co)polymerization of olefin can be carried out in a liquid phase using olefin itself as a solvent or a gas phase without using a solvent, but it is preferably carried out in the presence of aliphatic hydrocarbon in order to control (co) polymerization of a small amount of olefin and carry out it homogeneously.

The pre-activated metallocene supported catalyst described above can be used as a catalyst system for copolymerization of propylene with α, ω-diene by combining with an organic aluminum compound.

In the present specification, the term [pre-activated] means to preliminarily activate the polymerization activity of the metallocene supported catalyst described above in a copolymerization reaction of propylene with α, ω-diene by (co)polymerizing a small amount of at least one olefin to support it on the above metallocene supported catalyst so that it is suited to the respective conditions of a slurry polymerization method, a gas phase polymerization method and a bulk polymerization method. Also, the term of the (co)polymerization means homopolymerization and copolymerization. Further, the term of [pre-(co)polymerization] of olefin means to preliminarily (co)polymerize a small amount of at least one olefin in the presence of a catalyst in prior to the main polymerization of olefin in order to pre-activate the catalyst, and the term of [olefin pre-(co) polymer] means an olefin pre-(co)polymer obtained by pre-(co)polymerizing olefin in prior to the main polymerization of olefin.

In the pre-activated metallocene supported catalyst, the olefin pre-(co)polymer obtained by pre-(co)polymerization is further carried in an amount of 0.01 to 100 kg, preferably 0.05 to 50 kg per kg of the metallocene supported catalyst described above.

Olefins for the olefin (co)polymer supported on the pre-activated metallocene supported catalyst described above include linear olefins having 2 to 20 carbon atoms, for example, ethylene, propylene, 1-butene, 1-pentene, 4-methyl-1-pentene, 2-methyl-1-pentene, 1-hexene, 1-octene, 1-decene and 1-dodecene, and a homopolymer thereof or a copolymer of two or more kinds thereof is supported. In particular, an olefin copolymer comprising mainly ethylene or propylene is suited as the olefin (co) polymer for supporting. These olefin (co)polymers have a limiting viscosity [η] falling in a range of preferably 0.1 to 10 dl/g, more preferably 0.2 to 7 dl/g.

Pre-(co)polymerization of olefin carried out in aliphatic hydrocarbon is carried out by introducing 0.01 to 1,000 kg, preferably 0.1 to 500 kg of olefin into a slurry comprising 1 kg of the solid product-c and 0.005 to 5 m³, preferably 0.01 to 1 m³ of aliphatic hydrocarbon to carry out (co) polymerization reaction of olefin on a temperature condition of −50 to 100° C., preferably 0 to 50° C. for one minute to 50 hours, preferably 3 minutes to 20 hours.

In the pre-(co)polymerization of olefin described above, the reaction product of the cross-linked metallocene compound with aluminoxane is supported on the metallocene supported catalyst, and therefore an aluminum compound such as trialkylaluminum and a co-catalyst represented by aluminoxane do not have to be added again, but they can be added if necessary. An addition amount of these co-catalysts falls preferably in a range of 1,000 moles or less, more preferably 500 moles or less in terms of an aluminum atom per mole of the transition metal contained in the metallocene supported catalyst. Further, the pre-(co)polymerization of olefin described above may be carried out in the presence of hydrogen to control a molecular weight of the resulting olefin (co)polymer.

The pre-activated metallocene supported catalyst obtained above can be stored in a slurry state obtained after finishing the pre-(co)polymerization, a state in which it is resuspended in aliphatic hydrocarbon after finishing the pre-(co)polymerization of olefin and then washing it with aliphatic hydrocarbon or a state in which it is dried after separating aliphatic hydrocarbon.

In the production process of the propylene base copolymer used in the present invention, copolymerized is propylene with α, ω-diene or copolymerizing propylene with α, ω-diene and the second copolymerization component in the presence of the olefin (co)polymerization catalyst system obtained by combining the metallocene supported catalyst or pre-activated metallocene supported catalyst described above with the organic aluminum compound.

The organic aluminum compound constituting the catalyst system described above is a compound represented by a formula:

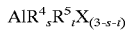

wherein $R^4$ and $R^5$ each represent independently a hydrocarbon group such as an alkyl group having 1 to 10 carbon atoms, a cycloalkyl group and an aryl group or a phenyl group which may have a substituent such as an alkoxy group, a fluorine atom, a methyl group and a trifluorophenyl group; X represents a halogen atom; and s and t are an optional integer satisfying $0<s+t\leq 3$.

Capable of being given as examples of the organic aluminum compound represented by the formula described above are trialkylaluminum such as trimethylaluminum, triethylaluminum, triisopropylaluminum, triisobutylaluminum, tri-n-butylaluminum, tri-n-hexylaluminum and tri-n-octylaluminum; dialkylaluminum hydride such as dimethylaluminum hydride, diethylaluminum hydride, diisopropylaluminum hydride and diisobutylaluminum hydride; dialkylaluminum halide such as dimethylaluminum chloride, dimethylaluminum bromide, diethylaluminum chloride and diisopropylaluminum chloride; and alkylaluminum sesquihalide such as methylaluminum sesquichloride, ethylaluminum sesquichloride, ethylaluminum sesquibromide and isopropylaluminum sesquichloride. These compounds may be used in the form of a mixture of two or more kinds thereof.

The preferred organic aluminum compound is trialkylaluminum such as triethylaluminum, triisobutylaluminum, tri-n-butylaluminum, tri-n-hexylaluminum and tri-n-octylaluminum, and the most preferred compound is triethylaluminum or triisobutylaluminum.

A use amount of the organic aluminum compound falls in a range of 1 to 5,000 moles, preferably 5 to 3,000 moles and particularly preferably 10 to 1,000 moles in terms of an Al atom contained in the organic aluminum compound per mole of the transition metal contained in the catalyst system.

A use amount of the catalyst system for (co) polymerization is $1 \times 10^{-10}$ to $1 \times 10^{-3}$ mole, preferably $1 \times 10^{-9}$ to $1 \times 10^{-4}$ mole in terms of the transit metal contained in the catalyst system per liter of the polymerization volume. Controlling the use amount of the catalyst system in the range described above makes it possible to maintain the efficient and controlled copolymerization reaction rate of propylene, α, ω-diene and olefins which are the second copolymerization component.

The term of [polymerization volume] means a volume of a liquid phase part in a polymerization vessel in the case of liquid phase polymerization and a volume of a gas phase part in the polymerization vessel in the case of gas phase polymerization.

Publicly known copolymerization processes can be used for the copolymerization process, and capable of being used is a slurry polymerization process in which olefins are copolymerized in an inert solvent including aliphatic hydrocarbons such as butane, pentane, hexane, heptane and isooctane, alicyclic hydrocarbons such as cyclopentane, cyclohexane and methylcyclohexane, aromatic hydrocarbons such as toluene, xylene and ethylbenzene, a gasoline fraction and a hydrogenated diesel oil fraction, a bulk polymerization process in which olefins themselves are used as a solvent, a gas phase polymerization process in which olefins are copolymerized in a gas phase or a polymerization process in which two or more processes thereof are combined.

Usually, the same copolymerization conditions as in a copolymerization process of olefins carried out with a publicly known Ziegler-Natta catalyst system are employed for the copolymerization conditions in the copolymerization processes described above. Usually, for example, propylene, α, ω-diene and, if necessary, olefin which is the second copolymerization component are fed at a polymerization temperature of −50 to 150° C., preferably −10 to 100° C. and particularly preferably 45 to 90° C. in the presence of hydrogen which is a molecular weight-controlling agent so that the polymerization pressure is maintained at an atmospheric pressure to 7 MPa (gauge pressure), preferably 0.2 to 5 MPa (gauge pressure) to copolymerize them for one minute to 20 hours.

After finishing the copolymerization reaction, passed through are, if necessary, publicly known after-treating steps such as a catalyst deactivation-treating step, a catalyst residue-removing step, a drying step and the like, and then the intended propylene base copolymer is obtained. The final propylene base copolymer thus obtained is blended with, if necessary, various additives such as an antioxidant, a UV absorber, an antistatic agent, a nucleating agent, a lubricant, a flame retardant, an anti-blocking agent, a colorant and an inorganic or organic filler and various synthetic resins and then is heated, molten and kneaded. Further, it is cut into particles and used in the form of pellets for producing the foamed article of the present invention.

The polypropylene base resin composition for foam-molding of the present invention is prepared by adding a foaming nuclear agent to the propylene base copolymer described above. Further, the above polypropylene base resin composition for foam-molding is heated, molten and kneaded, and then gas or a volatile liquid is dispersed in the molten resin, whereby one of the foamed articles of the present invention is obtained. Further, the following specific process can be given as an example of the production processes for the above foamed article.

Capable of being given as examples thereof are a process in which gas or a vaporized volatile liquid which is a foaming agent is pressed into the polypropylene base resin composition for foam-molding described above which is blended with the foaming nuclear agent and molten under applying pressure and stirred and dispersed, and then the pressure is released to obtain the above polypropylene base resin-foamed article and a process in which a volatile liquid which is a foaming agent is mixed with the polypropylene base resin composition for foam-molding which is blended with the foaming nuclear agent at an atmospheric pressure and a room temperature and in which the above propylene base copolymer is heated under applying pressure up to a temperature at which the copolymer is molten and the volatile liquid is vaporized and stirred, and then the pressure is released to obtain the above polypropylene base resin-foamed article.

Capable of being given as examples of the volatile liquid used in these processes are liquefied Freon gas, liquid nitrogen, carbon dioxide gas and hydrocarbons such as liquefied ethane, liquefied propane and liquefied butane.

Capable of being given as examples of the foaming nuclear agent are N,N'-dinitropentamethylenetetramine, azodicarbonamide, p,p'-oxybisbenzenesulfonylhydrazide, succinic acid, talc and sodium bicarbonate. An addition amount of the above foaming nuclear agent shall not specifically be restricted and is preferably a proportion of 0.1 to 10 parts by weight per 100 parts by weight of the propylene base copolymer.

The foamable polypropylene base resin composition of the present invention is a composition prepared by adding 0.1 to 50 parts by weight of a foaming agent to 100 parts by weight of the propylene base copolymer described above. The above foamable polypropylene base resin composition is heated and molten to allow the foaming agent to foam and then cooled and solidified, whereby the polypropylene base resin-foamed article of the present invention is obtained.

In this case, the foaming agent has to be added in a proportion of 0.1 to 50 parts by weight, preferably 0.1 to 30 parts by weight and more preferably 0.3 to 25 parts by weight in order to obtain the foamed article having a high foaming magnification and uniform foamed cells.

The foaming agent used here is a substance generating gas by decomposition or a volatile liquid, and publicly known and used materials which are used for plastics and rubbers can be used without any problems. To be specific, capable of being given as examples thereof are azodicarbonamide, dinitropentamethylenetetramine, p,p'-oxybisbenzenesulfonylhydrazide, p,p'-oxybisbenzenesulfonylsemicarbazide, N,N'-dimethyl-N,N'-dinitrosoterephthalamide, sodium bicarbonate and dichlorodifluoromethane. Among them, azodicarbonamide and dichlorodifluoromethane are preferably used.

Any process can be used for the production process for the foamable polypropylene base resin composition prepared by adding a specific amount of the foaming agent described above to the propylene base copolymer and shall have any specific problems as long as the unfoamed foaming agent can remain in the above resin composition and it is a blending method in which the above foaming agent can uniformly be dispersed and mixed in the propylene base copolymer. To be specific, the following processes can be given as examples thereof: a process in which prescribed amounts of the propylene base copolymer and the foaming agent are blended by means of a tumbler mixer and a Henschell mixer(trade name); and a process in which the propylene base copolymer, the foaming agent and water are put in a closed vessel and the temperature is elevated to 100 to 150° C. while stirring and maintained and in which one end of the vessel is opened while maintaining a pressure of the vessel at about 30 kg/cm$^2$ and materials remaining in the vessel are discharged to the atmosphere and dried to obtain the above resin composition having a bead form.

EFFECT OF THE INVENTION

Foam-molding carried out using the polypropylene base resin composition for foam-molding of the present invention and the foamable polypropylene base resin composition provides a foamed article having uniform and fine foamed cells (bubbles) and a high foaming magnification, and heat-molding of the above foamed article provides a foam-molded product having uniform and fine foamed cells (bubbles) and a high foaming magnification. Accordingly, the above resin composition can suitably be used in the foam-molding field using a polypropylene base resin composition.

EXAMPLES

The present invention shall be explained below in further details with reference to examples and comparative examples.

Definitions of terms used in the examples and the comparative examples and measuring methods for a physical property shall be shown below.

(1) Melt flow rate (MFR): a value (unit: g/10 minutes) measured on a condition 14 (applying a load of 21.18N under a condition of 230° C.) in Table 1 based JIS K7210.

Example 1

(1) Preparation of metallocene supported catalyst:

A flask of 5 liters which was sufficiently dried and substituted with nitrogen was charged with 6.1 g (14.1 mmol) of dimethylsilylene(2,3,5-trimethylcyclopentadienyl)(2',4',5'-trimethylcyclopentadienyl)zirconium dichloride and 4,160 mmol of a toluene-diluted product of methylaluminoxane in terms of Al, and stirring was maintained for 10 minutes to react them, whereby a metallocene catalyst was obtained. Then, added to a solution containing the metallocene catalyst which was the above reaction product was 100 g of silica (manufactured by Grace Davison Co., Ltd.) which was baked at 800° C. for 8 hours, and stirring was maintained at 100° C. for one hour to bring them into contact with each other, whereby produced was a slurry containing a solid product-b which was a crude metallocene supported catalyst.

The slurry containing the solid product-b which was the crude metallocene supported catalyst described above was cooled down to 0° C. in 10 minutes, and 2,800 ml of n-hexane was added to maintain stirring for 10 minutes to thereby wash it. Then, the slurry was stood still to separate a supernatant (solvent), and the supernatant was removed by decantation. The same washing and solvent-separating operation was repeated three times, and then 2,800 ml of n-hexane was added to obtain a slurry in which fine particles of the refined metallocene supported catalyst was dispersed in n-hexane.

(2) Pre-activation:

Propylene was continuously added to the metallocene supported catalyst fine particles/n-hexane slurry obtained above at a flow rate of 4,500 ml/minute at 0° C. for 50 minutes to pre-polymerize propylene to thereby pre-activate the catalyst. After standing still, the supernatant (solvent) was removed by decantation, and an operation of washing with 2,800 ml of n-hexane to separate the solvent was repeated five times, followed by vacuum-drying at a room temperature for 2 hours to obtain 360 g of a pre-activated metallocene supported catalyst. A result obtained by analyzing a composition of the above catalyst showed that 0.22% by weight of Zr was present in the resulting pre-activated metallocene supported catalyst.

(3) Production of propylene/1,9-decadiene copolymer:

An autoclave reactor having a volume content of 50 liters which was sufficiently substituted with nitrogen was charged in order with 20 liters of n-hexane, 12.5 mmol of triethylaluminum and 82 mmol of 1,9-decadiene and stirred for 5 minutes. Then, 3.3 g of the pre-activated metallocene supported catalyst prepared above was added, and a temperature of the reactor was elevated to 60° C. Propylene was fed so that a pressure of the reactor became a fixed pressure of 1 MPaG and reacted for 2 hours. After finishing the reaction time, 500 ml of methanol was added to terminate the reaction, and unreacted propylene was removed, followed by filtering the hexane slurry, whereby a powder of a propylene/1,9-decadiene copolymer was obtained. The powder thus obtained was dried at 60° C. for 8 hours to obtain 7 kg of the propylene/1,9-decadiene copolymer. Results of analysis thereof showed that a content of 1,9-decadiene in the copolymer was 0.03% by weight. The resulting propylene/1,9-decadiene copolymer had an MFR of 2.8 g/10 minutes. The same copolymer was produced three times to obtain total 21 kg of the propylene/1,9-decadiene copolymer, and a blend thereof was used to produce the following foamed matters.

(4) Production of pelletized resin composition:

Mixed with 100 parts by weight of the propylene/1,9-decadiene copolymer were 0.3 part by weight of tetrakis [methylene-3-(3',5'-di-t-butyl-4'-hydroxyphenyl) propionate], 0.1 part by weight of 1,1,3-tris(2-methyl-5-t-butyl-4-hydroxyphenyl)butane, 0.01 part by weight of tris (2,4-di-t-butylphenyl)phosphite, 0.1 part by weight of calcium stearate and 0.2 part by weight of glycerin monostearate. Then, used was a single screw extrusion-pelletizer having a screw diameter of 40 mm in which an extruding temperature was set at 230° C. to obtain the pelletized propylene/1,9-decadiene copolymer. The pellets thus obtained were used to mold the following foamed plate.

(5) Preparation and Evaluation of the foamed-article

Used was an extrusion facility for foaming in which a single screw extruder (screw diameter: 40 mm, L/D ratio: 32) having a barrel port for injecting a volatile liquid in the middle of a barrel was combined with a single screw extruder (screw diameter: 50 mm, L/D ratio: 26) to feed a resin composition for foam-molding containing talc as a foaming nuclear agent in a proportion of 0.7 part by weight per 100 parts by weight of the pelletized propylene/1,9-decadiene copolymer into the first stage 40 mm extruder having the barrel port described above at a rate of 15 kg/hour to melt and knead it. Thereafter, n-butane which was a volatile liquid was pressed thereinto from the barrel port at a rate of 150 g/hour to disperse the above volatile liquid therein, and then the mixture was fed into the second stage extruder having a screw diameter of 50 mm to extrude a tubular foamed article from a circular die (lip diameter: 40 mm, lip gap: 0.4 mm) which was controlled in a temperature so that such a minimum resin temperature as producing no irregularities on a foamed article surface was maintained. Air was blown to the inside and the outside of this tubular foamed article from a ring for blowing air, and the tubular foamed article was drawn at a rate of 2.0 m/minute so that the inside of the tubular foamed article was brought into contact with a cooling mandrel (diameter: 110 mm), and this tube was cut and opened to obtain a foamed plate. The extruder of a diameter of 40 mm having the barrel port had a temperature of 235° C. in the first zone, 205° C. in the second zone, 185° C. in the third zone and 185° C. in the fourth zone, and the 50 mm extruder had a temperature of 167° C. in the first zone and 165° C. in the second to fifth zones, a dice temperature of 175° and an extruded resin temperature of 168° C. (the extruded resin temperature was measured in a breaker plate part provided in the circular die of the 50 mm extruder). The foamed plate thus obtained was a good foamed plate which had a thickness of 2.2 mm, a density of 0.04 g/cm$^3$ and an average cell diameter of 0.3 mm and which had uniform cells.

Comparative Example 1

Pellets of a propylene homopolymer were produced in the same manner as in Example 1, except that 1,9-decadiene was not used. The propylene homopolymer thus obtained had an MFR of 3 g/10 minutes. The resulting pelletized propylene homopolymer was used to produce a foamed article and evaluate it in the same manners as in Example 1. The foamed plate thus obtained was a foamed plate which had a thickness of 1.7 mm, a density of 0.085 g/cm$^3$ and an average cell diameter of 1.5 mm and which had uneven cells.

Comparative Example 2

A foamed plate was obtained in the same manner as in Example 1, except that used was a propylene homopolymer which was produced using a catalyst system for polymerizing olefin comprising a titanium base solid catalyst and an organic aluminum compound and which had a general MFR of 3 g/10 minutes. The foamed plate thus obtained was a foamed plate which had a thickness of 1.8 mm, a density of 0.09 g/cm$^3$ and an average cell diameter of 1.2 mm and which had uneven cells.

What is claimed is:

1. A polypropylene base resin composition for foam-molding comprising a propylene•α, ω-diene base copolymer containing 0.00001 to 2% by weight of α, ω-diene and a foaming nuclear agent contained therein, wherein the propylene•α, ω-diene base copolymer is obtained by copolymerizing propylene with α, ω-diene in the presence of a catalyst system for (co)polymerizing olefin comprising a metallocene supported catalyst obtained by carrying out in order the following step (a) to step (c) or a pre-activated metallocene supported catalyst obtained by carrying out in order the following step (a) to step (d) and an organic aluminum compound:

(a): a step for reacting an organic transition metal compound having at least one π electron conjugated ligand with aluminoxane in an inert solvent to produce a reaction product-a which is a metallocene catalyst, (b): a step for supporting the reaction product-a which is a metallocene catalyst obtained in the step (a) into contact with an inorganic particulate carrier at a temperature of 85 to 150° C. in the presence of an inert solvent to support the above metallocene catalyst on the inorganic particulate carrier to produce a solid product-b which is a crude metallocene supported catalyst, (c): a step for producing a refined metallocene supported catalyst obtained by carrying out in order a step for washing at least twice the reaction product-b which is a crude metallocene supported catalyst obtained in the step (b) with aliphatic hydrocarbon at a temperature of −50 to 50° C., and (d): a step for supporting the metallocene supported catalyst obtained in the step (c) into contact with at least one olefin to (co)polymerize the above olefin and supporting an olefin pre-(co)polymer on the metallocene supported catalyst to produce a pre-activated metallocene supported catalyst.

2. A foamable polypropylene base resin composition comprising 100 parts by weight of the propylene•α, ω-diene base copolymer as described in claim 1 and 0.1 to 50 parts by weight of a foaming agent.

3. A polypropylene base resin-foamed article obtained by heating, melting and kneading the polypropylene base resin composition for foam-molding as described in claim 1 at a high temperature and a high pressure by means of an extruder, then dispersing gas or a volatile liquid in the above molten resin, extruding it under a low pressure to foam it and cooling and solidifying it.

4. A polypropylene base resin-foamed article obtained by heating, melting and kneading the foamable polypropylene base resin composition as described in claim 2 at a high temperature and a high pressure by means of an extruder, then extruding it under a low pressure to foam it and cooling and solidifying it.

5. A production process for a polypropylene base resin-foamed article, comprising heating, melting and kneading the polypropylene base resin composition for foam-molding as described in claim 1 at a high temperature and a high pressure by means of an extruder, then dispersing gas or a volatile liquid in the above molten resin, extruding it under a low pressure to foam it and cooling and solidifying it.

6. A production process for a polypropylene base resin-foamed article, comprising heating, melting and kneading the foamable polypropylene base resin composition as described in claim 2 at a high temperature and a high pressure by means of an extruder, then extruding it under a low pressure to foam it and cooling and solidifying it.

7. A foam-molded product prepared by heat-molding the polypropylene base resin-foamed article as described in claim.

8. A foam-molded product prepared by heat-molding the polypropylene base resin-foamed article obtained by the production process as described in claim.

* * * * *